No. 671,635. Patented Apr. 9, 1901.
W. H. SAUVAGE.
AUTOMATIC FREIGHT OPERATING CAR BRAKE.
(Application filed Feb. 5, 1900.)
(No Model.) 4 Sheets—Sheet 1.
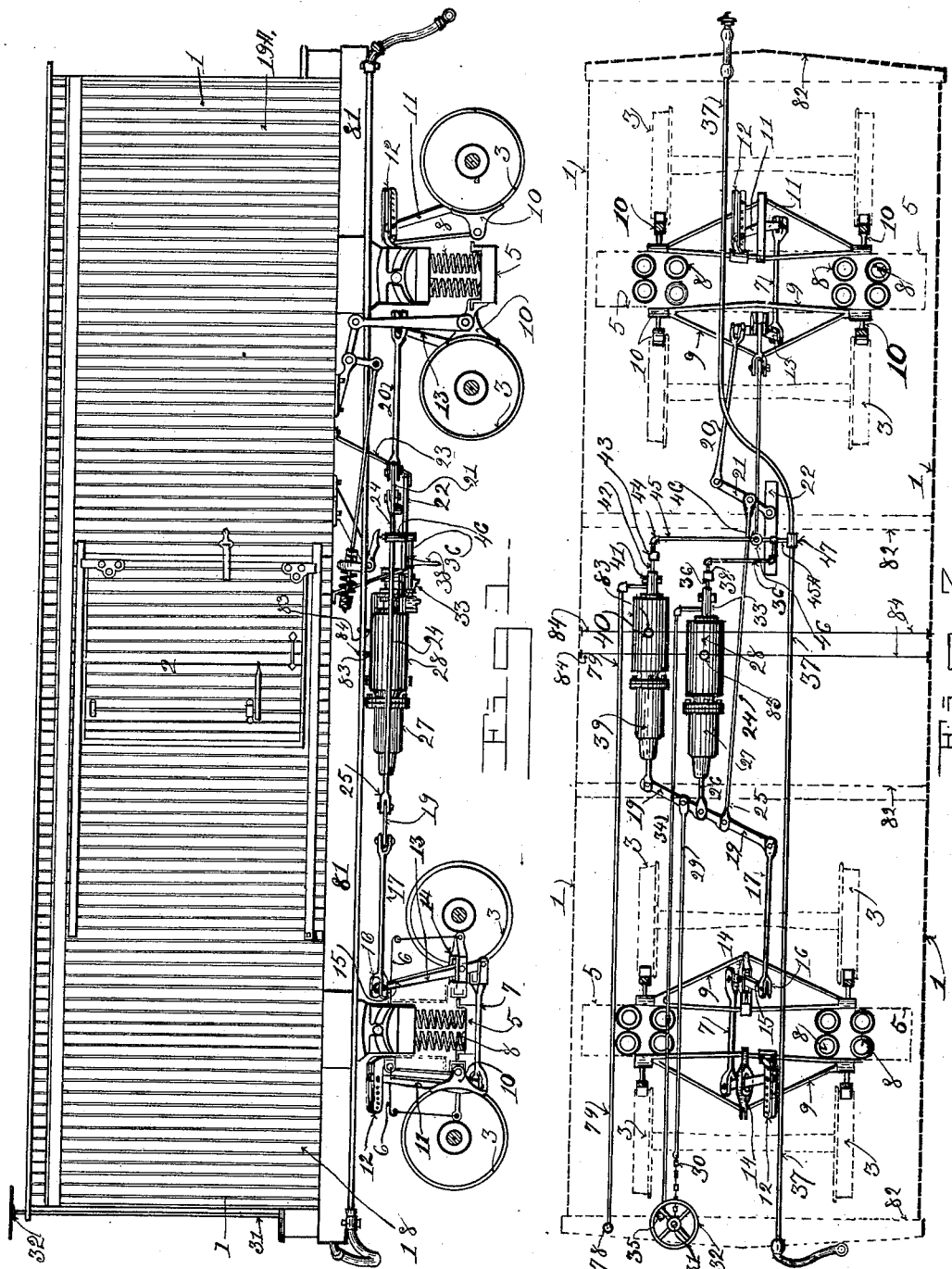
WITNESSES: INVENTOR.
Charles C Welch William H Sauvage
Claude A Dunn. BY
H. S. Bailey. ATTORNEY.

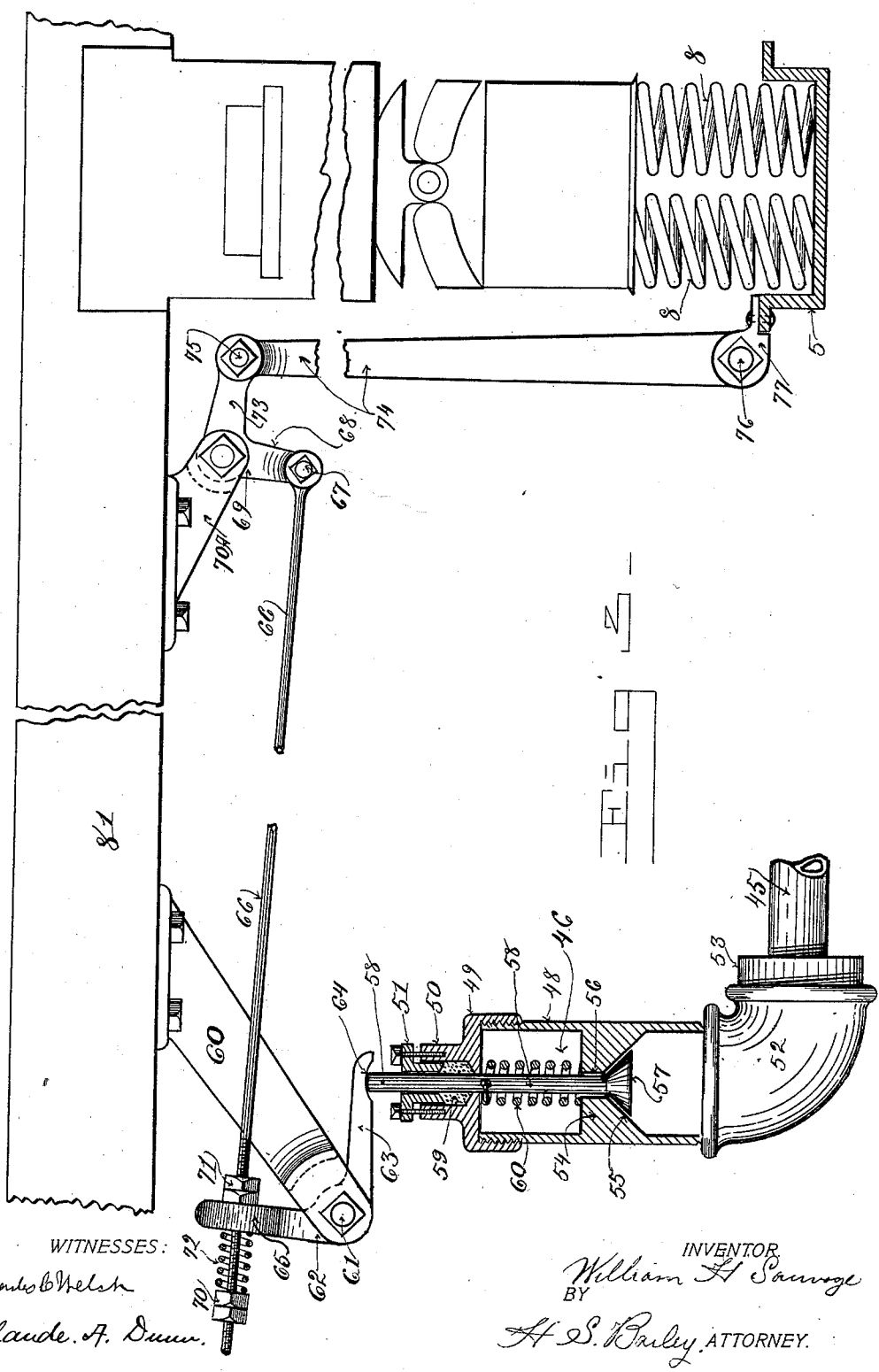

No. 671,635. Patented Apr. 9, 1901.
W. H. SAUVAGE.
AUTOMATIC FREIGHT OPERATING CAR BRAKE.
(Application filed Feb. 5, 1900.)
(No Model.) 4 Sheets—Sheet 3.
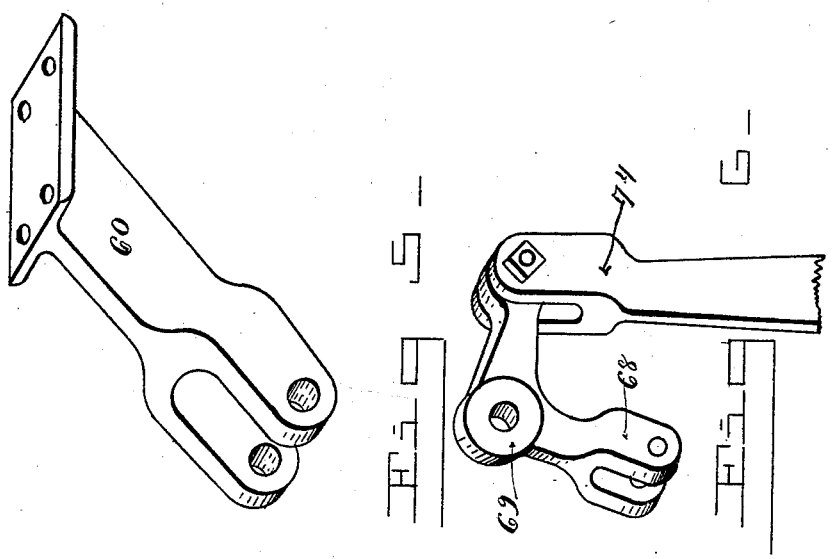
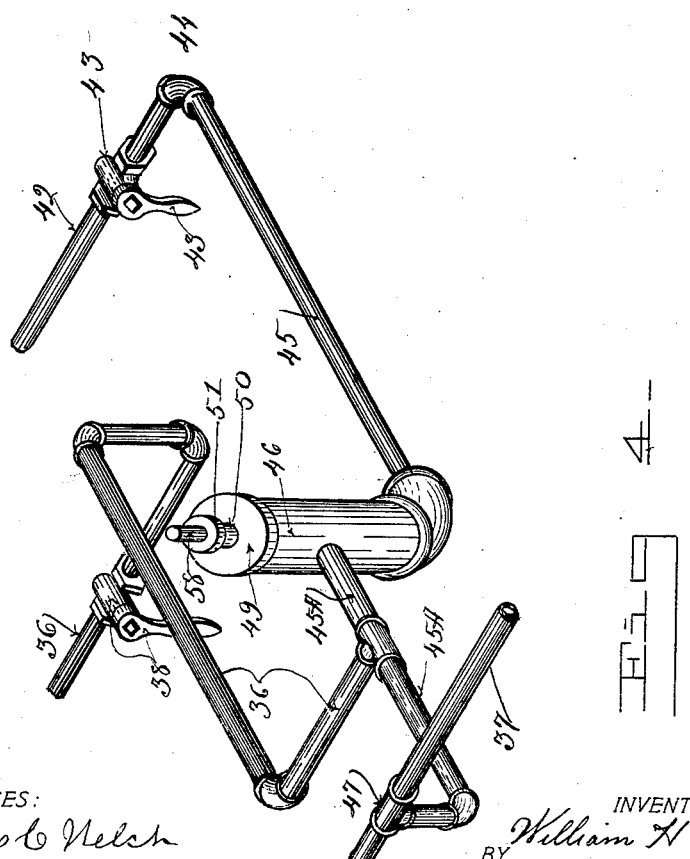
WITNESSES:
Charles C Welch
Claude A. Dunn
INVENTOR
William H. Sauvage
BY
H. E. Bailey. ATTORNEY.

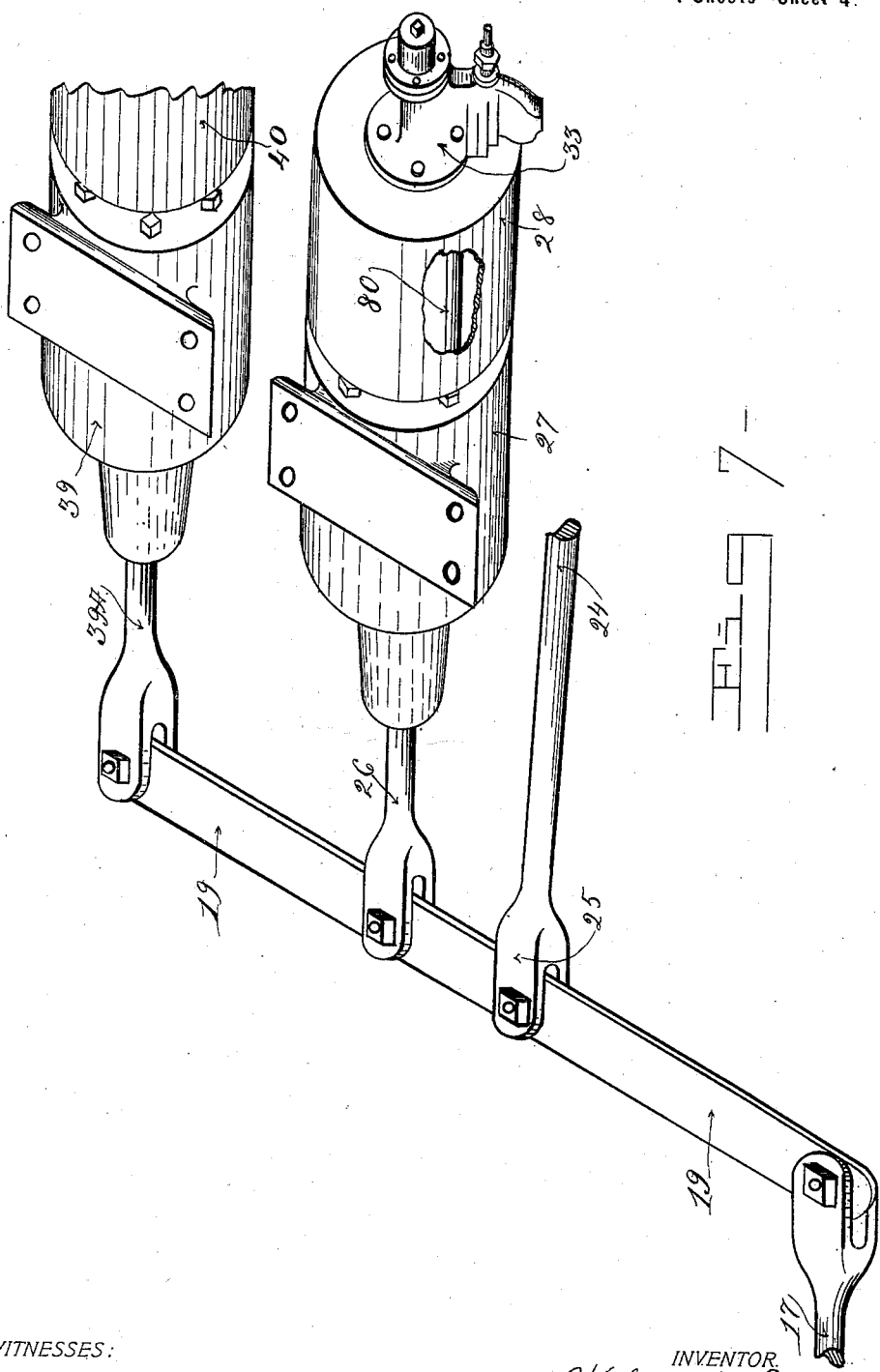

UNITED STATES PATENT OFFICE.

WILLIAM H. SAUVAGE, OF DENVER, COLORADO, ASSIGNOR, BY DIRECT AND MESNE ASSIGNMENTS, TO THE SAUVAGE DUPLEX AIR BRAKE COMPANY, OF SAME PLACE.

AUTOMATIC FREIGHT-OPERATING CAR-BRAKE.

SPECIFICATION forming part of Letters Patent No. 671,635, dated April 9, 1901.

Application filed February 5, 1900. Serial No. 4,069. (No model.)

*To all whom it may concern:*

Be it known that I, WILLIAM H. SAUVAGE, a citizen of the United States of America, residing at Denver, in the county of Arapahoe and State of Colorado, have invented certain new and useful Improvements in Automatic Freight-Operating Car-Brakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improvement in freight-car air-brakes; and the objects of my invention are, first, to provide a reserve or supplementary air-pressure cylinder; second, to provide a supplementary air-pressure reservoir and cylinder that is at all times operatively connected with the steam-engine and pump and with the main air-reservoir of the train and that is arranged to apply automatically its reserve pressure to the brakes by the weight of the freight or load on the car; third, to provide a supplementary brake system that will apply to the brakes an automatically-variable pressure to the brakes from the weight of the load of freight independent of the weight of the car itself, and, fourth, to provide a supplementary air-reserve brake-actuating device governed and applied automatically by the load of a freight-car that can be applied to any freight-car equipped with the Westinghouse or any other automatic or straight air-brake system. I attain these objects by the mechanism illustrated in the accompanying drawings, in which—

Figure 1 is a side elevation of a freight-car equipped with my supplementary freight-actuating air-brake system, with portions of the truck removed, and showing the axles in section. Fig. 2 is a plan view of the mechanism shown in Fig. 1. The outlines of the car are, however, shown in dotted lines, and portions of the truck are not shown to avoid confusion. Fig. 3 is an enlarged fragmentary view of a portion of my freight-actuating air-brake. Fig. 4 is a fragmentary perspective view of a portion of the piping and of the automatic release-valve that is actuated by the load of freight. Fig. 5 is a perspective view of a supporting-bracket. Fig. 6 is a fragmentary perspective view of a portion of the actuating mechanism of the release-valve; and Fig. 7 is a fragmentary perspective view of a freight-car's auxiliary reservoir and cylinder, showing my air-pressure reserve supplementary cylinder connected to the brake-operating lever.

Similar figures of reference refer to similar parts throughout the several views.

Referring to the drawings, the numeral 1 designates a freight-car; 2, the sliding doors; 3, the wheels of the trucks; 5, the bolster of the truck; 6, the parallel rod-springs; 7, the bottom rods; 8, the springs; 9, the brake-beams; 10, the brake-shoes; 11, the dead truck-lever; 12, the dead-lever fulcrum; 13, the live truck-lever, and 14 the brake-beam strut. These several parts constitute the main feature of the brake mechanism that is attached to the trucks of a freight-car.

The live truck-levers 13, which are located at opposite ends of the car, are pivotally secured at their free ends 15 to one end of the rods 17 and 20, the rod 17 being pivotally secured at its end 16 to the live lever 13 at the end 18 of the car and at its opposite end to one end of the cylinder's lever 19, and the rod 20 at the end $19^A$ of the car is pivoted at one end to the live lever 13 and at its opposite end to one end of a lever 21. The opposite end of the lever is pivoted to a fulcrum-block 22, which is attached to the body of the car by braces 23 or in any convenient manner.

To the lever, between its ends, one end of a rod 24 is pivoted, which is called the "cylinder-lever" rod. The opposite end 25 of this rod is pivotally secured to the cylinder-lever 19. The cylinder-lever is pivotally secured to the end of the piston-rod 26 of the air-brake cylinder 27. The auxiliary air-reservoir 28 is bolted to the cylinder. The cylinder-lever 19 extends beyond the end of the cylinder 27 a short distance, and at its end a rod 29 is pivoted. This rod is called a "hand-brake" rod, and its opposite end is secured by a chain 30 to a hand-brake rod 31, to the upper end of which a hand-wheel 32 is secured. To the opposite end of the cylinder a triple valve 33 is connected. From the triple valve a pipe 34 leads to a pressure-retaining valve 35. From the triple valve a pipe 36 extends to the train-pipe 37. A cut-out valve 38 is placed in the pipe 36. The train-pipe extends under the whole length of the car and couples with another car at each end and receives a supply of air from the main reservoir, which is located on the locomotive.

The combined cylinder 27 and reservoir 28, together with the above-described system of levers, pipes, rods, and brakes, constitute the principal elements of the Westinghouse air-brake system as applied to freight-cars by the Master Car-Builders' Association. This brake system as applied to freight-cars is adapted to brake about seventy per cent. of the weight of a car alone; but it is not adapted to brake above that or to adjust its braking power to different loads placed on the car. The tendency of the railroad companies is to increase the capacity and weight of their freight-cars, and there are many in use that carry from forty to fifty tons, and most of the new cars of this capacity are built of steel. The present automatic air-brake system is inadequate to hold these cars when partially or wholly loaded when going down mountain grades or to make quick stops at high speed on level roads, as they have not the power to brake over seventy per cent. of the weight of the empty car alone and have no brake-power on the load. Consequently when several of these heavy cars are placed in a train they are very hard to control on downgrades or high speeds and cannot always be controlled with safety.

The object of my invention is to introduce into the air-brake system of freight-cars a reserve supplementary braking power that is controlled and operated by the weight of the freight on the car alone and that works independent of the regular system, but at the same time receives its air-supply from the regular system and coöperates with it to control the car.

I preferably carry out my invention in the following manner: I place a combined air-brake cylinder 39 and an air-reservoir 40 alongside of the air-reservoir and cylinder of the regular brake system and then provide a new cylinder-lever 19, long enough to extend from the hand-brake rod to the end of the piston 39ᴬ of the cylinder 39, to which it is pivotally connected. This cylinder may be placed far enough away from the regular cylinder to give an additional length to the cylinder-lever of from about one-half to about twice the distance of the piston of the regular cylinder from the rod 17, thus increasing the power of this lever over the brake-rods from two to four times the power that can be applied under the regular system. To the opposite end of the reservoir 40 a triple valve 41 is connected in the usual manner, and from this triple valve a pipe 42 extends a short distance to a cut-out valve 43 and from this cut-out valve to an elbow 44, which turns into a pipe 45, that extends and connects to a valve 46, from which a pipe 45ᴬ extends to a T 47 in the train-pipe. I insert in the pipe 45 the valve 46, which I term an "automatic air-release" valve. This valve is preferably placed in the transverse center of the car, so as to be in line with the king-bolt of the adjacent truck. This air-release valve comprises a cylinder 48, having a cap 49 threaded to its top portion, on the top of which a stuffing-box 50 is formed, to which is threaded a gland 51. To its lower end an elbow 52 is threaded, in the free end of which a reducing-nipple 53 is threaded, from which the pipe 45 extends. Across the center of the cylinder a diaphragm 54 extends, in the bottom of which a valve-seat is formed, which is preferably a conical hole 55, which extends axially up into the diaphragm. A hole 56 also extends from the top of the conical hole through the diaphragm. A round conical valve 57 is fitted tightly in the valve-seat, and a valve-stem 58 extends from the valve through the diaphragm and stuffing-box of the cap, which is filled with suitable packing 59 to prevent air from leaking from the valve-cylinder. Above the diaphragm a spring 60 surrounds the valve-stem, and its top end is attached to the stem close to the cap, while its lower end rests on the diaphragm. The air enters the valve from the train-pipe above the diaphragm through the pipe 45ᴬ. To the bottom of the car, over this automatic release-valve, I bolt a bracket 60. The free end of this bracket is bifurcated, and to it is pivotally secured by a bolt 61 a right-angled lever 62. One arm 63 of this lever bears on top of the valve-stem 58, a cupped recess 64 being formed in its end for the top of the valve-stem to bear in. The other arm 65 extends upward and leans slightly to one side of the bracket. Through the end of this arm one end of a rod 66 passes freely and extends to near the adjacent truck of the car, where it is pivotally attached by a bolt 67 to an arm 68 of a crank-lever 69. The end of the rod that passes through the arm 65 extends beyond it a short distance and is provided with a thread and nuts 70 and 71, which are placed on opposite sides of the arm. The nuts 71 are placed against that side of the arm nearest the opposite crank-arm 68. The nuts 70 form an abutment for one end of a spring 72, which surrounds the rod, the opposite end of which bears against the arm, thus forming a yielding or elastic or compensating connection between the rod and arm, which allows the valve to seat firmly. The crank-arm lever 69 is pivotally secured to a bracket 70ᴬ, that is bolted to the bottom of the car. The other arm 73 of the lever 69 is pivotally attached to the top end of an arm 74 by a bolt 75, the opposite end of which is pivotally attached by a bolt 76 to a bracket 77, which is secured to the center of the bolster of the car, in which position it is subjected to only the direct downward pressure of the weight of the car under its load, while if the lever 74 and the bracket 70ᴬ were positioned out of the center of the car and bolster they would be subjected to the side tip of the car. The supplementary cylinder is also provided with a pressure-retaining valve 78 and a pipe 79, leading from the triple valve at the end of its reservoir. The supplementary cylinder is necessarily made a little longer than the cylinder of the regular system, as the sweep of the extended cylinder-lever is greater at the supplementary than at the regular cylinder. Consequently its piston and cylinder should be enough longer than the regular to allow the piston of the regular to make its customary or full stroke.

The operation of my automatic freight-weight car-braking device is as follows: Assume that the car is empty and that the car and train-pipe are operatively connected in a train to a locomotive-engine and to the main air-reservoir and to the pump and that the supplementary brake mechanism is arranged to act under any weight of freight placed upon the car from a few hundred pounds up to the full carrying weight of the car above the weight of the car itself. The train-pipe is filled with air under pressure, which is constantly flowing into it from the pumps and main reservoir. This air flows unobstructed into the pipes that lead from the train-pipe to the triple valve of the reservoir of the general cylinder and through this valve into this reservoir in the manner common to the Westinghouse system. At the same time the air from the train-pipe is flowing constantly into the automatic release-valve of the supplementary system and under the pressure of the air the valve is pressed down and opened and the air flows through the connecting-pipes to the triple valve of the supplementary reservoir and through it into the reservoir. Now if the car is loaded or partially loaded with freight the weight of the freight causes the car to sink down on the springs, and as it does so in loading the car the bracket 70ᴬ lowers with it and causes the arm 68 of the crank-lever 69 to swing toward the adjacent truck, and in doing so the arm pulls on the rod 66, which pulls on the arm 65 of the crank-lever 62 and causes the arm 63 to press down on the top of the valve-stem, and thus open the valve, and the weight of the load of freight holds the valve open automatically as long as it is on the car. If a car has only an eighth or quarter or any other part of its full load, it will sink only that portion of its whole movement on the springs when it is loaded; but it will nevertheless hold the valve open in the same proportion of the movement required to hold it fully open under a full load on the car. The power of the supplementary cylinder is then applied to the cylinder-lever and through it to the brakes in the same manner as in the general system, which is as follows: When the engineer wishes to apply the brakes, he reduces the pressure of the air in the train-pipe, which he can do from one to a number of pounds per square inch. If he is carrying sixty pounds to the square inch in the auxiliary reservoir and reduces ten pounds in the train-pipe, the air rushes from the auxiliary reservoir into the triple valve, which closes the air-inlet pipe from the train-pipe, but opens to a pipe 80, (see Fig. 7,) that leads into the cylinder. This air then exerts from about ten to twenty pounds pressure per square inch on the piston of the supplementary cylinder, which is exerted on the cylinder-lever by the outward movement of the piston and is transmitted to the brakes by the system of rods connected to the cylinder-lever. Now if the cylinder and brake levers of the general system are arranged and set to exert a brake-pressure of four thousand eight hundred pounds to the brakes with the leverage given between the different brake-rods that connect to the cylinder-lever and the piston of the general cylinder, and if the supplementary cylinder is positioned and arranged and the cylinder-lever is lengthened to increase the leverage of the cylinder-lever over these brake-rods from one and one-half to two or two and one-half or three times the leverage the general cylinder has over them, as indicated by the proportional distances apart of these rods on this lever in Fig. 7, it will give when acting under the same air-pressure, which it always does, from one and one-half to three times the pressure upon these brake-rods as the general cylinder is capable of doing, which means an additional brake-power of from seventy-two thousand to one-hundred and forty-four thousand over that of the general system, and all of this extra power is used to hold the load over and above that required to hold the car.

When there is no load on the car, the air is forced through the automatic release-valve and into and through the triple valve into the reservoir of the supplementary cylinder, which is thus always charged, but it is not released, and consequently is not available to operate the supplementary cylinder, except under the actuating influence of the weight of freight on the car.

81 designates the lower sill of the car; 82, cross-beams; 83, the release-valve, and 84 the release-valve rods.

My invention is very simple. It can be applied to all freight-cars in use, using the automatic air or straight system at very little expense and in a few hours of time, and it will enable the heaviest freight-cars to be easily controlled at all speeds and on all grades.

While I have shown and described a preferred construction and arrangement of mechanical elements in connection with the supplementary cylinder and the downward movement of the car under a load, I do not wish to be limited to the construction or arrangement shown, as there are many modifications of this mechanism which I could use without departing from the spirit of my invention.

Having described my invention, what I claim as new, and desire to secure by Letters Patent, is—

1. In an automatic freight-operating car-brake, the combination with the regular and supplementary cylinders and reservoirs, of an extended cylinder-lever pivotally attached to the pistons of both cylinders, air-supply pipes leading to said cylinders, an air-release valve arranged in the supply-pipe of said supplementary cylinder and having a projecting valve-stem, a two-armed lever pivotally attached to said car over said air-release valve, one arm of which is in operative engagement with said valve-stem, a spring arranged to operate said valve-stem in one direction of its movement, and mechanism connected with said car by which the sinking of the car under the weight of a load of freight operates the other arm of said two-armed lever to engage said valve-stem and operate said valve, substantially as described.

2. The combination of a freight-car; with the regular brake system comprising the general cylinder and its reservoir, the cylinder-lever having an extension and the brake-rods connected to said cylinder-lever, the supplementary cylinder attached directly to the body of a freight-car and having a piston pivotally attached at its outer end to said extension of said cylinder-lever, the air-release valve, the two-armed lever pivotally secured to the bottom of the car, a lever pivoted at one end to the adjacent truck of the car, and arranged to be moved by the rise and fall of the car and pivotally attached at its opposite end to one arm of said two-armed lever and having the other arm pivotally secured to a rod, a second two-armed lever pivoted to the bottom of said car having one arm in operative engagement with said valve and having the opposite end of said rod slidably secured in one direction to the end of the other arm, nuts threaded to said rod and bearing against one side of the adjacent end of one arm of said lever, and a spring bearing at one end against the opposite side and nuts threaded to the end of said rod for an abutment for and to adjust the tension of said spring, substantially as described.

3. The combination with the regular freight-car air-brake system comprising the cylinder and reservoir, the cylinder-lever connected to the piston of said cylinder and the brake-rods connecting said cylinder-lever with the brakes of the car, of the cylinder-lever having an extension, the supplementary cylinder and reservoir attached to the under side of the floor of the freight-car, the piston in said supplementary cylinder pivotally attached to and arranged to apply its power upon said cylinder-lever in the same direction and in coöperative unison with the piston of said general cylinder, the triple valve, the air-supply pipe and the air-release valve having a projecting valve-stem spring controlled in one direction of its movement, of a two-armed lever pivotally attached to the bottom of said car and arranged with one arm of said lever resting on the top of said valve-stem, a rod secured to the opposite arm provided with a spring-acting, slidable connection in one direction of its movement, a two-armed lever pivotally attached to the opposite end of said rod at the end of one of its arms and pivotally secured by a suitable bracket to the bottom of said car and a lever pivotally secured at one end to the other arm of said two-armed lever and pivotally attached at its opposite end to the bolster or lower part of one of the trucks of said car, substantially as described.

4. The combination in a freight-car air-brake system; of the train-pipe, the live and dead brake-levers, the cylinder-lever having an extension and the regular combined cylinder and reservoir attached to the bottom of a freight-car the piston in said regular cylinder pivotally connected to said cylinder-lever, with the supplementary cylinder and reservoir arranged parallel with said regular cylinder and attached to the bottom of a freight-car the piston in said supplementary cylinder directly connected to said extension of said cylinder-lever, and having said supplementary cylinder and its piston arranged and adapted to coöperatively exert its power in the same direction and in conjunction with said general cylinder and its piston on said cylinder-lever, the triple valve, the air-supply pipe connecting said supplementary reservoir and triple valve with said train-pipe, the air-release valve in said air-supply pipe, the two-armed levers; the brackets supporting said levers from said car, the rod connecting with said two-armed levers and having a spring-controlled compensating and yielding connection at one end and the lever pivotally secured to the truck of said car and connected to one of said arms, substantially as described.

In testimony whereof I affix my signature in presence of two witnesses.

WILLIAM H. SAUVAGE.

Witnesses:
 CHARLES C. WELCH,
 CLAUDE A. DUNN.